(12) United States Patent
Barina et al.

(10) Patent No.: US 7,546,943 B2
(45) Date of Patent: Jun. 16, 2009

(54) APPARATUS, SYSTEM, AND METHOD FOR POSITIONING A PRINTED CIRCUIT BOARD COMPONENT

(75) Inventors: Richard M. Barina, Sebring, FL (US); Dean Frederick Herring, Youngsville, NC (US); John Paul Scavuzzo, Hillsborough, NC (US); Paul Andrew Wormsbecher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/242,324

(22) Filed: Oct. 3, 2005

(65) Prior Publication Data
US 2007/0075118 A1 Apr. 5, 2007

(51) Int. Cl.
*H05K 7/20* (2006.01)
(52) U.S. Cl. .................. 228/44.7; 361/707; 361/719; 361/720; 257/706; 257/707; 257/712; 257/713
(58) Field of Classification Search ............... 228/44.7; 361/704
See application file for complete search history.

(56) References Cited

U.S. PATENT DOCUMENTS

| | | | | |
|---|---|---|---|---|
| 5,883,782 A | * | 3/1999 | Thurston et al. | 361/704 |
| 6,249,436 B1 | * | 6/2001 | Bollesen | 361/720 |
| 7,106,594 B2 | * | 9/2006 | Vetter et al. | 361/719 |
| 2004/0125570 A1 | * | 7/2004 | Amber et al. | 361/707 |
| 2004/0212963 A1 | * | 10/2004 | Unrein | 361/704 |
| 2005/0231918 A1 | * | 10/2005 | Goldmann | 361/704 |
| 2006/0133041 A1 | * | 6/2006 | Belady et al. | 361/704 |

OTHER PUBLICATIONS

U.S. Appl. No. 09/951,927, filed Sep. 13, 2001, Dean Frederick Herring, et al.

* cited by examiner

*Primary Examiner*—Kiley Stoner
*Assistant Examiner*—Devang Patel
(74) *Attorney, Agent, or Firm*—Kunzler & McKenzie

(57) ABSTRACT

An apparatus, system, and method are disclosed for positioning a printed circuit board component. A clamping member applies a clamping force to a levering member linked to a positioning member. The levering member biases the positioning member toward a printed circuit board in response to the clamping force. The positioning member positions the printed circuit board and a component disposed on the printed circuit board in response to the positioning member bias. In one embodiment, the positioning member positions the component to contact a thermal device.

24 Claims, 8 Drawing Sheets

APPARATUS, SYSTEM, AND METHOD FOR POSITIONING A PRINTED CIRCUIT BOARD COMPONENT

BACKGROUND OF THE INVENTION

1. Field of the Invention

This invention relates to positioning a component and more particularly relates to positioning a printed circuit board component to contact a thermal device.

2. Description of the Related Art

Electrical components such as processors contain an increasing number of transistors and operate at ever-higher frequencies. As a result, the heat produced by a high-heat electrical component (hereinafter "component") has risen significantly, requiring more effective means of removing heat from the component. In many systems such a high-bandwidth server systems, the ability to remove heat from components is a key design constraint.

Thermal devices such as heat sinks, heat pipes, and active cooling systems have been used to remove heat from components. A thermal device requires an efficient thermal path from the component to the thermal device to effectively remove heat from the component. The efficiency of the thermal path increases as the thermal device and component are in physical contact over a broad area such that the length of the thermal path is minimized while the thermal path has the greatest possible area. Therefore the thermal device is typically positioned in close physical contact with the component, with compression between the thermal device and the component.

The component is often disposed on a flexible printed circuit board ("PCB") while the thermal device is typically constructed of rigid materials with high thermal conductivity. As a result, the PCB and component must be positioned to closely contact the thermal device. For example, the PCB may be biased toward the thermal device to improve contact between the component and the PCB.

Unfortunately, the PCB may reside in an enclosure that affords little space for devices to bias the PCB toward the thermal device. For example, an enclosure of a computer server may have only a small clearance between the PCB and the enclosure, requiring that any device used to bias the PCB fit within the small clearance. In addition, space constraints may require that the PCB be biased by making biasing adjustments from the thermal device side of the PCB. For example, the biasing device may only be accessible from the direction of the intended bias.

The PCB may include a plurality of components requiring thermal devices to remove heat. Each component must be positioned to closely contact a thermal device. Many PCBs that include a plurality of components requiring thermal devices are configured so that the PCB is not always populated with each component. For example, a PCB for a multi-processor computer may include sockets for eight processors. However, the PCB may be populated with from one to eight processors, depending on the processing requirements of the computer.

Unfortunately, the positioning of the PCB with eight components may be unacceptable for the PCB with only one component. For example, the PCB at a component socket may be biased away from a planar configuration, flexing toward a thermal device, because when the component is installed in the socket, the contact of the thermal device biases the PCB back to a normal planar configuration. Yet without the component in the socket, the PCB will remain biased away from the normal planar configuration, potentially stressing the PCB and violating PCB position requirements.

From the foregoing discussion, it should be apparent that a need exists for an apparatus, system, and method that position a component while operating within a small clearance. Beneficially, such an apparatus, system, and method would allow the positioning of the component within enclosures with little clearance between the component's PCB and the enclosure. In addition, the apparatus, system, and method would allow the PCB to maintain a desired configuration when populated with a variable number of components requiring contact with thermal devices.

SUMMARY OF THE INVENTION

The present invention has been developed in response to the present state of the art, and in particular, in response to the problems and needs in the art that have not yet been fully solved by currently available component positioning methods. Accordingly, the present invention has been developed to provide an apparatus, system, and method for positioning a component that overcome many or all of the above-discussed shortcomings in the art.

The apparatus to position a component is provided with a plurality of devices configured to functionally execute the necessary steps of applying a clamping force, biasing a positioning member, and positioning a component. These devices in the described embodiments include a positioning member, a clamping member, and a levering member.

The positioning member is configured to position a component. The component is disposed on a PCB. The positioning member positions the component by biasing the PCB. The biased PCB positions the component. The clamping member applies a clamping force to the levering member. In one embodiment, the clamping member applies the clamping force as a moment around an initial pivot point such that the levering member rotates about the pivot point.

The levering member is linked to the positioning member. The rotation of the levering member biases the positioning member toward the PCB such that the positioning member positions the PCB and the component disposed on the PCB and may move the component such that the component contacts a thermal device. The apparatus positions the component responsive to the clamping force and may position the component from within a volume with limited clearance.

A system of the present invention is also presented to position a component. The system may be embodied in a computer system such as a multiprocessor server. In particular, the system, in one embodiment, includes a thermal device, a PCB, a positioning member, a clamping member, a standoff, and a levering member.

The PCB includes a component such as a processor. In one embodiment, the PCB includes a plurality of processor components. Each component may be soldered to the PCB. In an alternate embodiment, each component is installed in a socket that is soldered to the PCB.

The thermal device is configured to remove heat from the component. In one embodiment, the thermal device removes heat from each of the plurality of components. The clamping member applies a clamping force to the levering member. The standoff is a pivot for the levering member. The levering member is linked to the positioning member and biases the positioning member toward the PCB by pivoting about the standoff in response to the clamping force. The positioning member positions the component by biasing the PCB such that the component contacts the thermal device.

A method of the present invention is also presented for positioning a component. The method in the disclosed embodiments substantially includes the steps necessary to carry out the functions presented above with respect to the operation of the described apparatus and system. In one embodiment, the method includes applying a clamping force, biasing a position member, and positioning a component.

A clamping member applies a clamping force to a levering member. The levering member biases a positioning member toward a PCB in response to the clamping force. The positioning member positions the PCB and a component disposed on the PCB in response to the positioning member bias. In one embodiment, the positioning member positions the component to contact a thermal device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention individually positions a component on a PCB in response to a clamping force. In addition, the present invention may allow the positioning of the component from within a space with limited clearance. The present invention may also allow the component to be individually positioned if the component is populated on the PCB. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
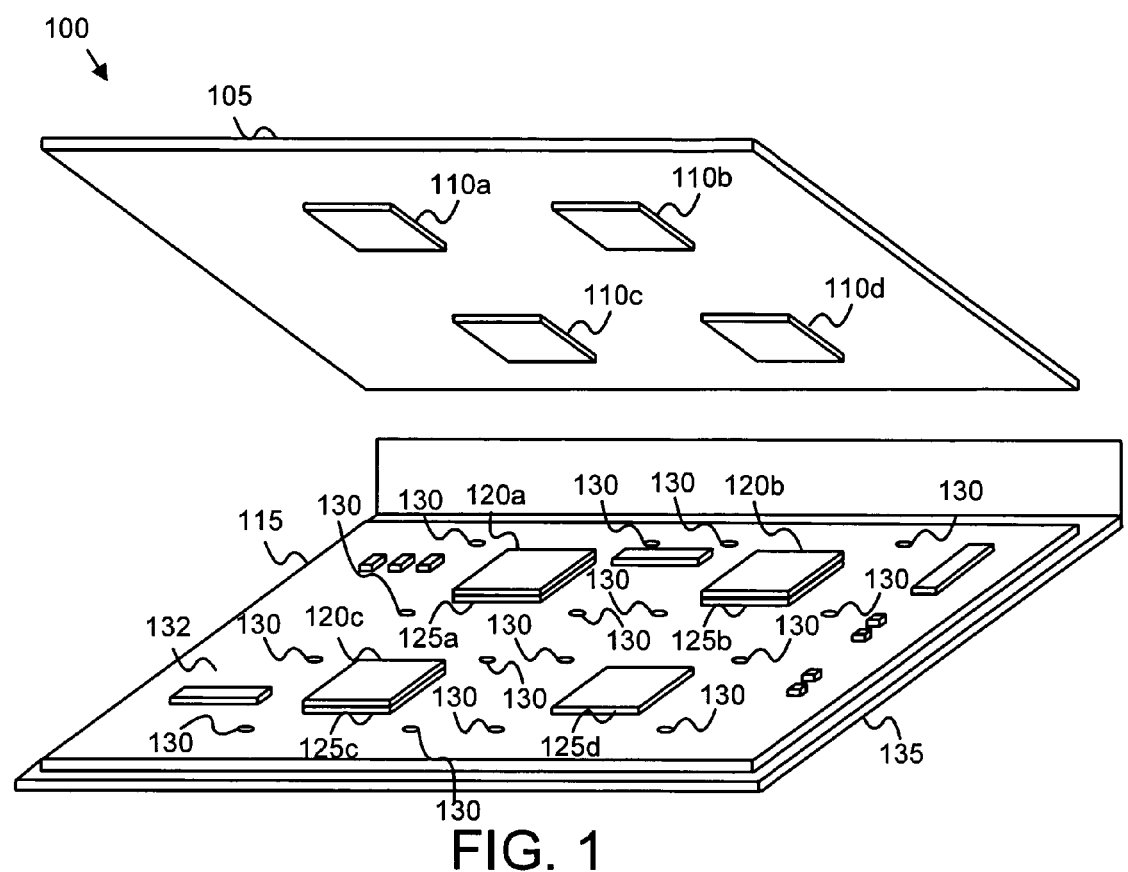
FIG. 1 is a perspective drawing illustrating one embodiment of a PCB/thermal device system in accordance with the present invention.

FIG. 1 is a perspective drawing illustrating one embodiment of a PCB/thermal device system 100 in accordance with the present invention. The system 100 includes an enclosure 135, a thermal device 105 and a PCB 115. The enclosure 135 houses the PCB 115 and the thermal device 105. In one embodiment, the enclosure 135 is a computer chassis. The enclosure 135 is depicted with limited clearance between the enclosure 135 and the PCB 115. For simplicity, only a portion of the enclosure 135 is depicted.

A plurality of electrical and/or mechanical devices including high-heat electrical components 120 (hereinafter "components") are disposed on the PCB 115. In the depicted embodiment, one or more components 120 are inserted in one or more sockets 125. Each socket 125 may be soldered to the PCB 115. For example, the component 120 may comprise a pin-grid array package, as is well know to those skilled in the art. The socket 125 may contain a plurality of cavities, each cavity configured to receive a component pin. Each cavity may be electrically connected to a pad on the PCB 115.

In an alternate embodiment, the component 120 is soldered directly to the PCB 115. The component 120 may comprise a ball-grid array package as is well known to those skilled in the art. The PCB 115 may comprise a plurality of pads. Each ball of the ball-grid array may be flow soldered such that the ball is electrically connected to a PCB 115 pad.

The component 120 may be a processor. The depicted PCB 115 is configured to receive up to four components 120. However, a PCB 115 may employ up to any number of components 120. The PCB 115 may be configured to operate with a variable number of components 120. The number of components 120 disposed on the PCB 115 may be a function of the operational requirements of the PCB 115. For example, if the PCB 115 is a server PCB 115 configured for high-bandwidth processing, the PCB 115 may include four components 120. If the PCB 115 is configured for lower bandwidth processing, the PCB 115 may include only one component 120.

The thermal device 105 is configured to remove heat from the components 120. In the depicted embodiment, the thermal device 105 is a heat sink. The thermal device 105 may be comprised of a material with high thermal conductivity to conduct heat from a heat source. In an alternate embodiment, the thermal device 105 may be configured to circulate coolant through one or more channels to conduct heat from the heat source.

The depicted thermal device 105 includes one or more thermal contacts 110. Each thermal contact 10 is configured to physically contact a component 120. For purposes of illustration, the thermal device 105 is depicted as removed from the PCB 115 and enclosure 135. The thermal contact 110 conducts heat from the component 120 and disperses the heat through the thermal device 105. The thermal contact 110 conducts heat more efficiently to the thermal device 105 when the thermal contact 110 is in close physical contact with the component 120, creating a short, broad thermal path between the component 120 and thermal contact 110.

In one embodiment, PCB 115 is biased toward the thermal contact 110 and thermal device 105 such that the component 120 closely contacts the thermal contact 110. The PCB 115 must be biased toward the thermal device 105 and thermal contact 110 by a force applied to the PCB 115 in a direction from the PCB 115 toward the thermal contact 110. Unfortunately, the clearance between the enclosure 135 and the PCB 115 is limited. Typically, the clearance is less than five millimeters. The present invention allows the PCB 115 to be biased to a specified position from within the narrow space between the enclosure 135 and the PCB 115. Advantageously, the PCB 115 is biased from a side of the PCB 115 opposite the side of the PCB 115 facing the tight space between the enclosure 135 and the PCB 115.

In an alternate embodiment, the component 120 may be biased into close physical contact with the thermal contact 110 by a compressing force. For example, a PCB 115 bowed away from the thermal device 105 may be biased toward the PCB's 115 normal planar configuration and the thermal device 105 and the thermal device 105 may be biased toward the PCB 115, compressing the thermal contact 110 and the component 120 together. As a result, the compression between the PCB 115 and component 120 may counteract the bias of the PCB 115, positioning the PCB 115 in a normal planar configuration.

Unfortunately, in the past, if the PCB 115 was not populated with one or more components 120, the missing component 120 could not receive the compressive force from the thermal contact 110 that counteracted the bias of the PCB 115, resulting in a deformation of the PCB 115 from the normal planar configuration. For example, the PCB 115 is depicted with a fourth socket 125d that is not populated with a component 120. Because no component 120 populates the fourth socket 125d, the PCB 115 bias is not counteracted at the fourth socket 125d and the PCB 115 may be deformed around the fourth socket 125d. The present invention allows each component 120 to be individually positioned by biasing the PCB 115, so that the PCB 115 is biased selectively near populated components 120.

In the depicted embodiment, the limited clearance between the PCB 115 and the enclosure 135 and absence of orifices or access panels in the enclosure 135 require that any manipulation that biases the PCB 115 and the component 120 toward the thermal device 105 be done from the component side 132 of the PCB 115. Thus the PCB 115 includes a plurality of vias 130 that allow a positioning apparatus between the enclosure 135 and the PCB 115 to be activated from the component side 132 of the PCB 115.

Figure 2:
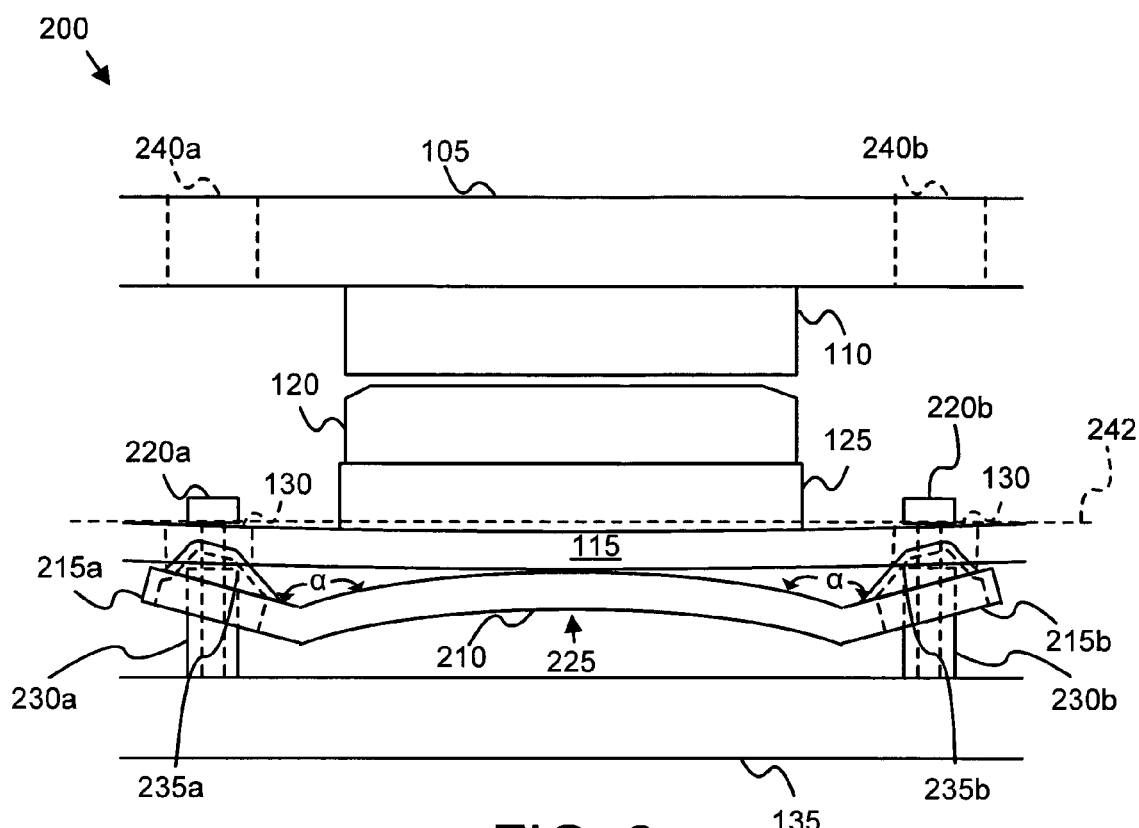
FIG. 2 is a side view illustrating one embodiment of an unbiased PCB/thermal system of the present invention.

FIG. 2 is a side view illustrating one embodiment of an unbiased PCB/thermal system 200 of the present invention. The system 200 may employ the thermal device 105 with thermal contact 110, the PCB 115 with socket 125 and component 120, and the enclosure 135 of FIG. 1. A positioning apparatus 225 is depicted between the PCB 115 and the enclosure 135. The apparatus 225 includes a positioning member 210, one or more clamping members 220, one or more levering members 215, and one or more standoffs 230.

In the depicted embodiment, the clamping member 220 is inserted through a hole in the levering member 215 and through a channel in the standoff 230. In addition, the clamping member 220 may be anchored to the enclosure 135. In one embodiment, the clamping member 220 is a bolt. The clamping member 220 may be threaded into a threaded hole in the enclosure 135. The standoff 230 contacts the levering member 215 at an initial pivot point 235.

The levering member 215 is connectedly linked with positioning member 210. In the depicted embodiment, the levering member 215 is linked at an angle a to the positioning member 210. In one embodiment, the levering member 215 and positioning member 210 comprise a contiguous device. The levering member 215 and positioning member 210 may be stamped metal.

The clamping member 220 may be activated through a via 130 in the PCB 115 that may be the via 130 of FIG. 1. In one embodiment, the thermal device 105 is provided with one or more holes 240 wherein the clamping member 220 is manipulated through the hole 240 and the via 130. In the depicted embodiment, the positioning member 210 is curved toward the PCB 115 although the depicted position member 210 is unbiased. The PCB 115 is also depicted as curved toward the positioning apparatus 225 with the PCB 115 compared to a straight edge 242 to highlight the curvature. In one embodiment, the unbiased positioning member 210 may contact the PCB 115.

With the position member 210 unbiased, the PCB 115 and the component 120 are positioned such that the component 120 is not contacting the thermal contact 110 of the thermal device 105. The PCB 115 and the thermal device 105 may be positioned within the enclosure 135 without interference from contact between the component 120 and the thermal contact 110. In addition, the component 120 may be positioned with the PCB 115 and the thermal device 105 installed in the enclosure 135.

Figure 3:
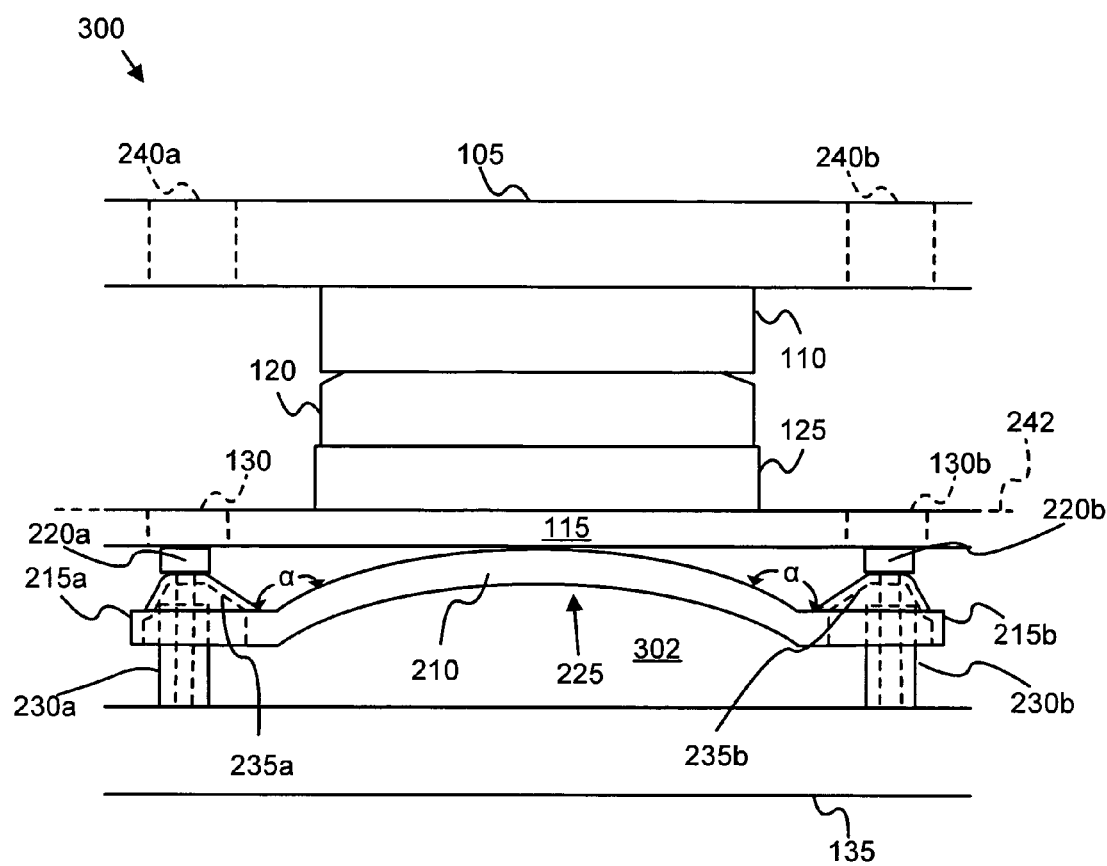
FIG. 3 is a side view illustrating one embodiment of a biased PCB/thermal system of the present invention.

FIG. 3 is a side view illustrating one embodiment of a biased PCB/thermal system 300 of the present invention. The system 300 depicts the elements of FIG. 2 with the positioning member 210 of the positioning apparatus 225 biased toward the PCB 115 such that the positioning member 210 positions the PCB 115 and the component 120 disposed on the PCB 115.

The clamping member 220 applies a clamping force to the levering member 215. In the depicted embodiment, the clamping member 220 is configured as a bolt. The clamping member 220 is threaded farther into the enclosure 135 than depicted in FIG. 2, applying the clamping force to the levering member 215.

The clamping force rotates the levering member 215 around the initial pivot point 235. The rotating levering member 215 biases the positioning member 210 toward the PCB 115. The biased positioning member 210 contacts the PCB 115 and biases the PCB 115 toward the thermal device 105. The component 120 disposed on the PCB 115 is also disposed toward the thermal device 105. In the depicted embodiment, the component 120 is biased into contact with the thermal contact 110 of the thermal device 115.

The positioning apparatus 225 positions the component 120 by biasing the PCB 115. In an alternate embodiment, the positioning apparatus 225 may position a plurality of components 120a-c (see FIG. 1) by biasing the PCB 115. The positioning apparatus 225 positions the component 120 from within the limited clearance 302 between the PCB 115 and the enclosure 135. In addition, the clamping member 220 of the positioning apparatus 225 maybe activated from the side of the PCB 115 opposite the positioning apparatus 225 or from the side of the thermal device 105 opposite the positioning apparatus 225, allowing the component 120 to be more easily and conveniently positioned.

Figure 4:
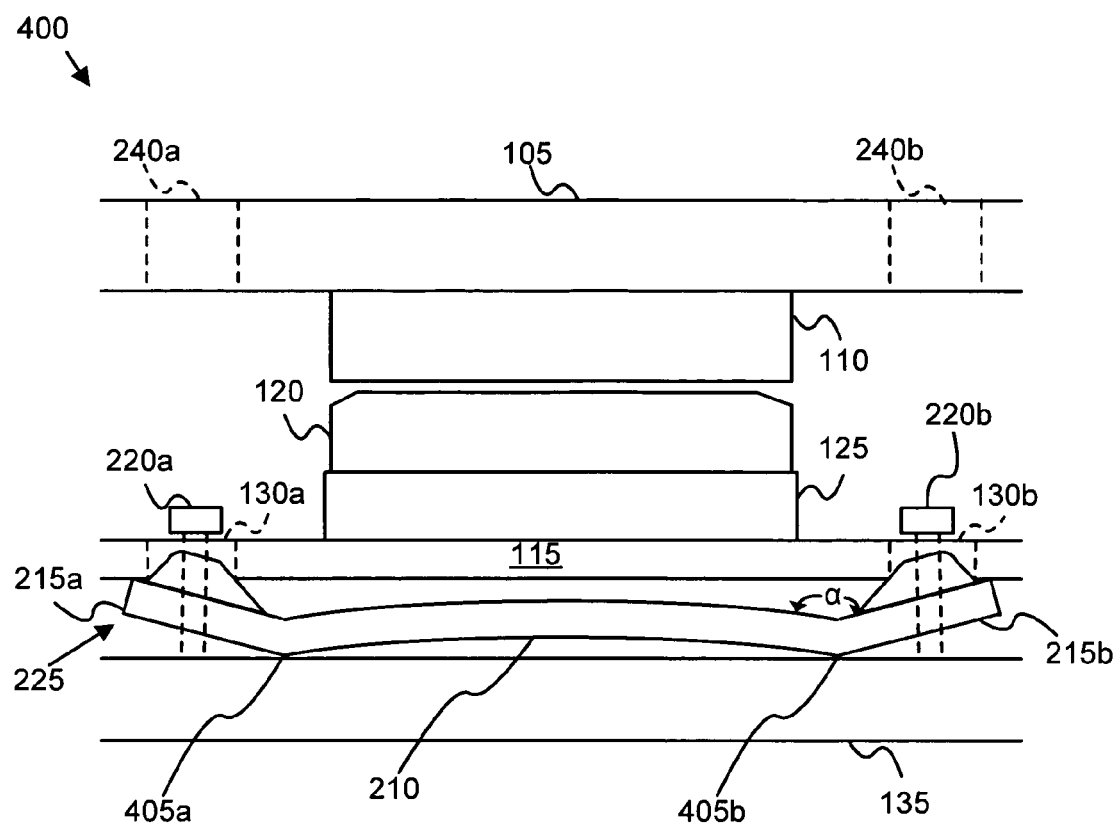
FIG. 4 is a side view illustrating one embodiment of an unbiased alternate PCB/thermal system of the present invention.

FIG. 4 is a side view illustrating one embodiment of an unbiased alternate PCB/thermal system 400 of the present invention. The system 400 may employ the thermal device 105 with thermal contact 110, the PCB 115 with socket 125 and component 120, and the enclosure 135 of FIG. 1. A positioning apparatus 225 is depicted between the PCB 115 and the enclosure 135. The apparatus 225 includes a positioning member 210, one or more clamping members 220, and one or more levering members 215.

In the depicted embodiment, the clamping member 220 is inserted through a hole in the levering member 215 and anchored in the enclosure 135. In one embodiment, the clamping member 220 is a bolt. The clamping member 220 may be threaded into a threaded hole in the enclosure 135. The levering member 215 contacts the enclosure 135 at an initial pivot point 405.

The levering member 215 is linked with positioning member 210. In the depicted embodiment, the levering member 215 is linked at an angle a to the positioning member 210. In one embodiment, the levering member 215 and positioning member 210 comprise an integrated piece. In an alternate embodiment, the levering member 215 and the positioning member 210 are connected by a fastener, adhesive, and/or weld.

The clamping member 220 maybe manipulated through a via 130 that maybe the via 130 of FIG. 1. In the depicted embodiment, the positioning member 210 is unbiased. With the position member 210 unbiased, the PCB 115 and the component 120 are positioned such that the component 120 is not contacting the thermal contact 110 of the thermal device 105.

Figure 5:
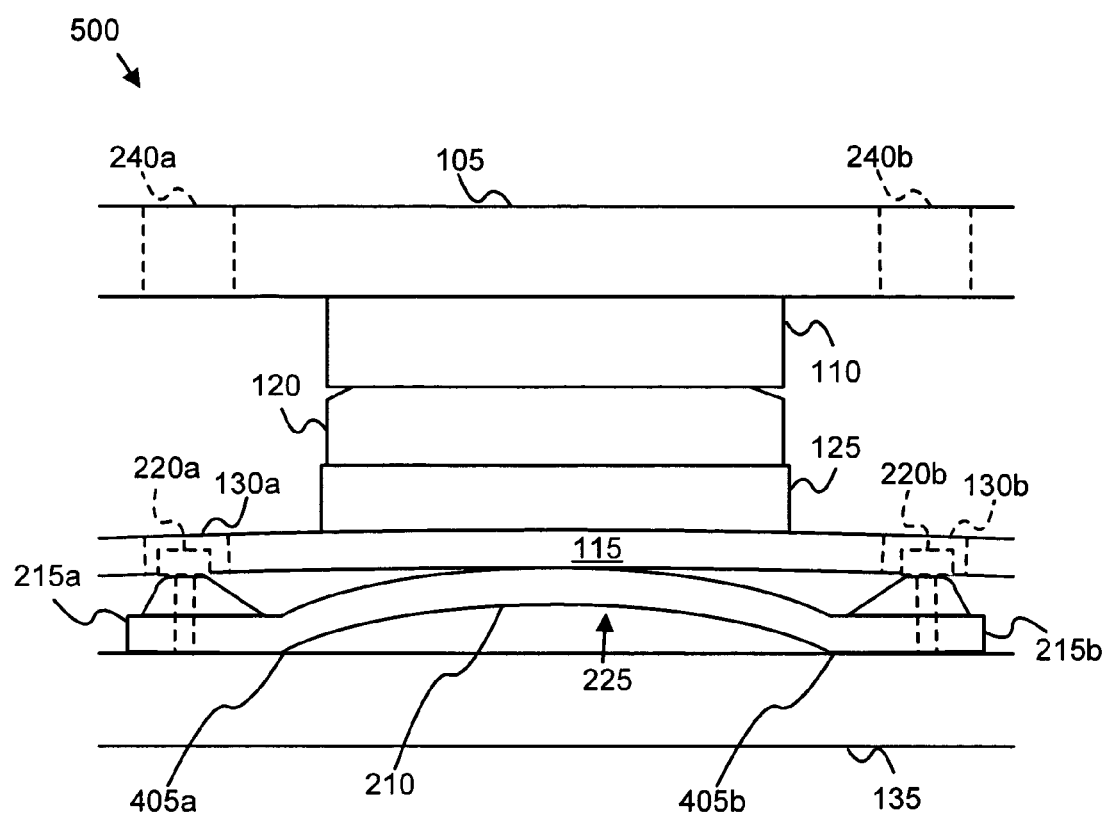
FIG. 5 is a side view illustrating one embodiment of a biased alternate PCB/thermal system of the present invention.

FIG. 5 is a side view illustrating one embodiment of a biased alternate PCB/thermal system 500 of the present invention. The system 500 depicts the elements of FIG. 4 with the positioning member 210 of the positioning apparatus 225 biased toward the PCB 115 such that the positioning member 210 contacts and positions the PCB 115 and thereby positions the component 120 disposed on the PCB 115.

The clamping member 220 applies a clamping force to the levering member 215. In the depicted embodiment, the clamping member 220 is configured as a bolt. The clamping member 220 is threaded farther into the enclosure 135 than depicted in FIG. 4, applying the clamping force to the levering member 215.

The clamping force rotates the levering member 215 around the initial pivot point 405. The rotating levering member 215 biases the positioning member 210 toward the PCB 115. The biased positioning member 210 contacts the PCB 115 and biases the PCB 115 toward the thermal device 105. The component 120 disposed on the PCB 115 is also disposed toward the thermal device 105. In the depicted embodiment, the component 120 is biased into contact with the thermal contact 110 of the thermal device 115. The positioning apparatus 225 may position one or more components 120 by biasing the PCB 115.

Figure 6:
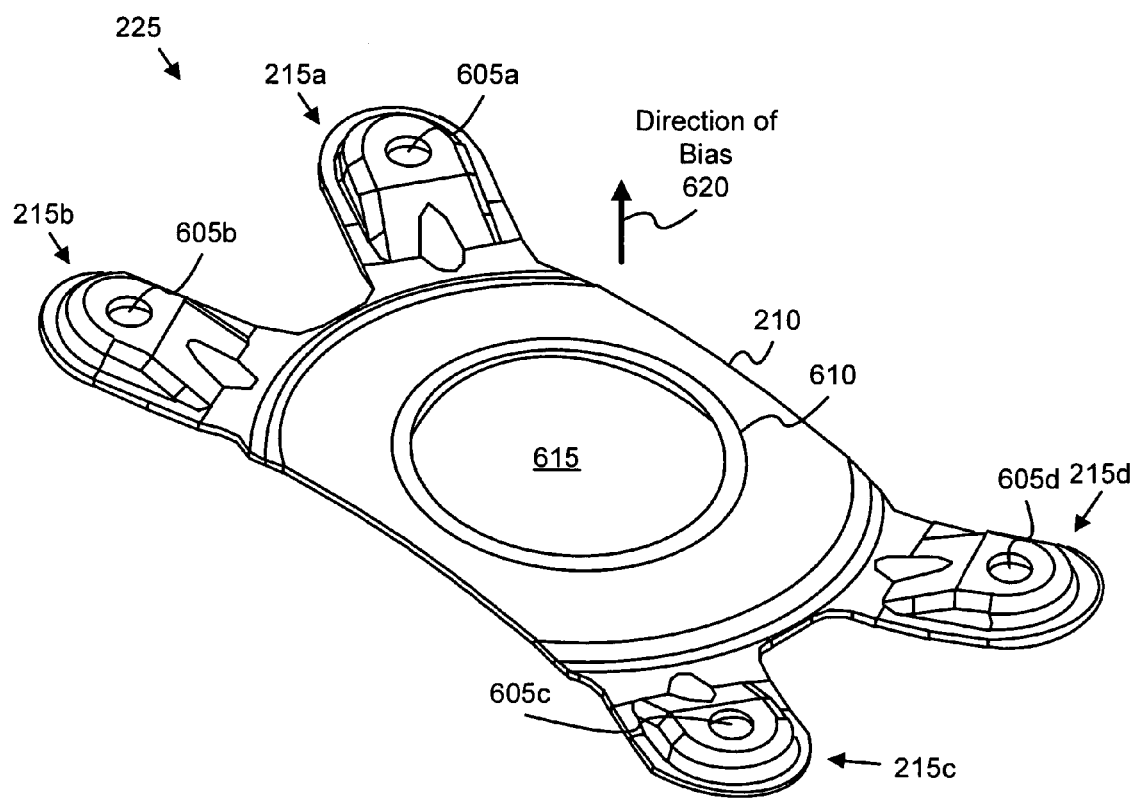
FIG. 6 is a perspective view illustrating one embodiment of a positioning apparatus of the present invention.

FIG. 6 is a perspective view illustrating one embodiment of a positioning apparatus 225 of the present invention. The positioning apparatus may be the positioning apparatus 225 of FIGS. 2-5. As depicted, the positioning apparatus 225 includes one or more levering members 215 with each levering member 215 comprising a hole 605, a contact ring 610, and a component well 615. Although the positioning apparatus 225 is depicted with four levering members 215, different numbers of levering members 215 may be employed.

In operation, the positioning apparatus 225 further includes a clamping member 220 such as the clamping members 220 illustrated in FIGS. 2-5. The clamping member 220 is not depicted with the positioning apparatus 225 of FIG. 6 to better illustrate the structure of the positioning apparatus 225.

The hole 605 is configured to receive the clamping member 220. In one embodiment, the clamping member 220 is a bolt. Alternatively, the clamping member 220 may comprise a clip. The hole 605 receives the shaft of the bolt such that the head of the bolt may apply a clamping force to the levering member 215. The clamping force may be applied to bias the levering member 215 to rotate about an initial pivot point such as the initial pivot points 230, 405 of FIGS. 2-5. Each levering member 215 is linked to the positioning member 210 such that when the levering member 215 pivots about the initial pivot point 230, the positioning member 210 is biased to pivot about the initial pivot point 230.

A first and second levering member 215a, 215b may bias the positioning member 210 to rotate about the first and second levering member 215a, 215b while a third and fourth levering member 215c, 215d may bias the positioning member 210 to rotate about the third and fourth levering member 215c, 215d. The combined rotational biases may bias the positioning member 210 to move in the direction of bias arrow 620.

In the depicted embodiment, the positioning member 210 is configured as a dome jack spring. The positioning member 210 may also assume any other configuration capable of biasing a PCB 115 such as the PCB 115 of FIGS. 1-5. In the depicted embodiment, a contact ring 610 is disposed on the positioning member 210. The contact ring 610 may be comprised of a soft, deformable, and/or resilient material such that the contact ring 610 does not mar the PCB 115 when the positioning member 210 contacts the PCB 115 through the contact ring 610. The contact ring 610 may also be an electrical insulator. In one embodiment, the contact ring 610 is comprised of a polycarbonate material.

In one embodiment, the component well 615 is configured as an orifice within the positioning member 210. The component well 615 may allow the positioning member 210 to bias the PCB 115 without contacting a specified portion of the PCB 115. For example, the component well 615 may allow the positioning member 210 to bias the PCB 115 without contacting one or more pads such as pads for the socket 125 of FIG. 1. The component well 615 may also allow the positioning member 210 to avoid contact with one or more electrical devices disposed on the PCB 115.

In one embodiment, the positioning apparatus 225 comprises stamped metal. The positioning apparatus 225 maybe of single piece construction. In a certain embodiment, the positioning apparatus 225 is comprised of spring steel, stainless steel with a spring-hard temper, or the like. In an alternate embodiment, the positioning apparatus 225 is fabricated of two or more elements. The elements may be joined by an adhesive, a bolt and nut, and/or a weld.

Figure 7:
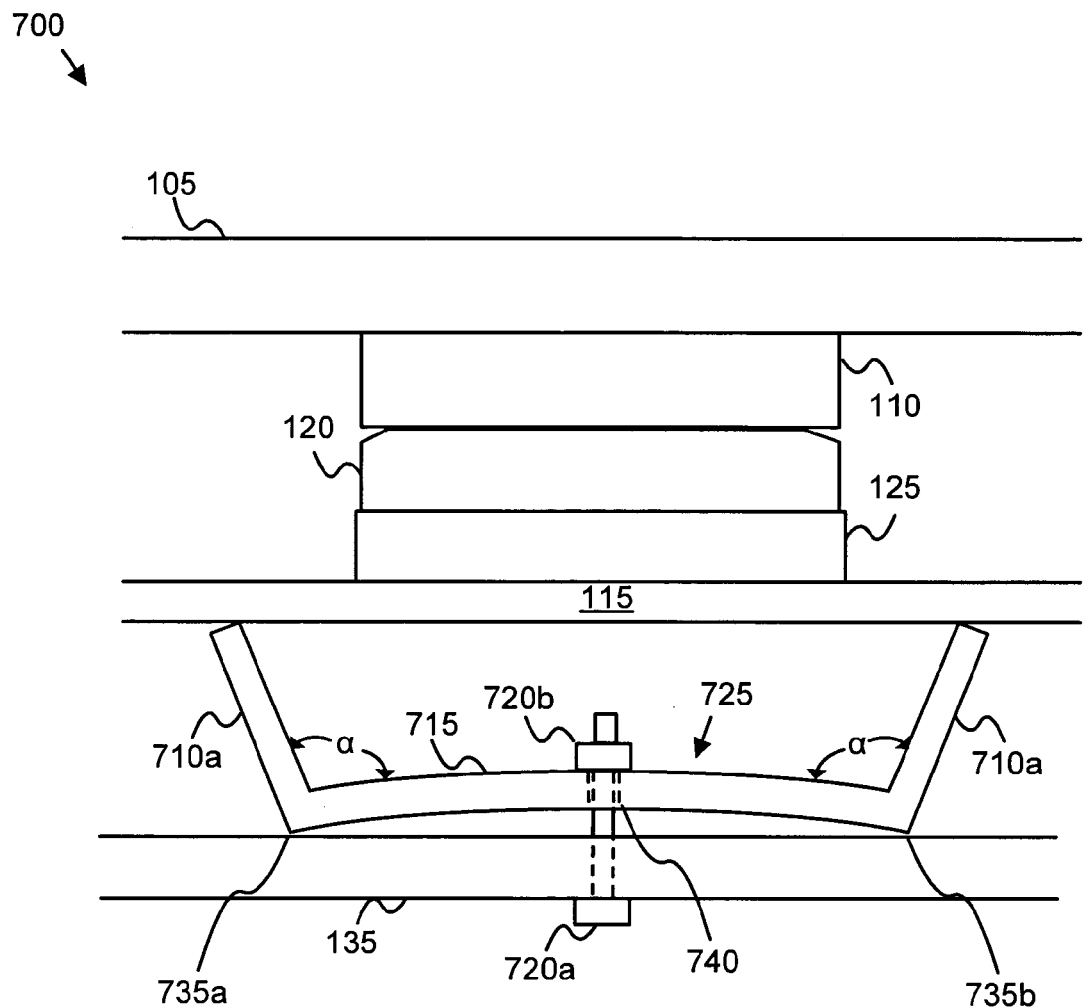
FIG. 7 is a side view illustrating one embodiment of biased center-clamped PCB/thermal system of the present invention.

FIG. 7 is a side view illustrating one embodiment of a biased center-clamped PCB/thermal system 700 of the present invention. The system 700 may employ the thermal device 105 with thermal contact 110, the PCB 115 with socket 125 and component 120, and the enclosure 135 of FIG. 1. A positioning apparatus 725 is depicted between the PCB 15 and the enclosure 135. The apparatus 725 includes one or more positioning members 710, a clamping member 720, and a levering member 715.

In the depicted embodiment, the clamping member 720 is inserted through a hole 740 in the levering member 215. In addition, the clamping member 720 is depicted as comprising a bolt 720a and a nut 720b.

The levering member 715 is linked with positioning members 710a, 710b. In the depicted embodiment, the levering member 715 is linked at an angle a to the positioning members 710a, 710b. The clamping member 720 applies a clamping force to the levering member 715. In the depicted embodiment, threading the nut 720b farther on the bolt 720a applies the clamping force to the levering member 715.

The clamping force rotates each end of the levering member 715 around either a first and second initial pivot point 735a, 735b. The rotating levering member 715 biases the positioning members 710a toward the PCB 115. The biased positioning members 710a, 710b contact the PCB 115 and bias the PCB 115 toward the thermal device 105. The component 120 disposed on the PCB 115 is also disposed toward the thermal device 105 such that the component 120 contacts the thermal contact 110 of the thermal device 105.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
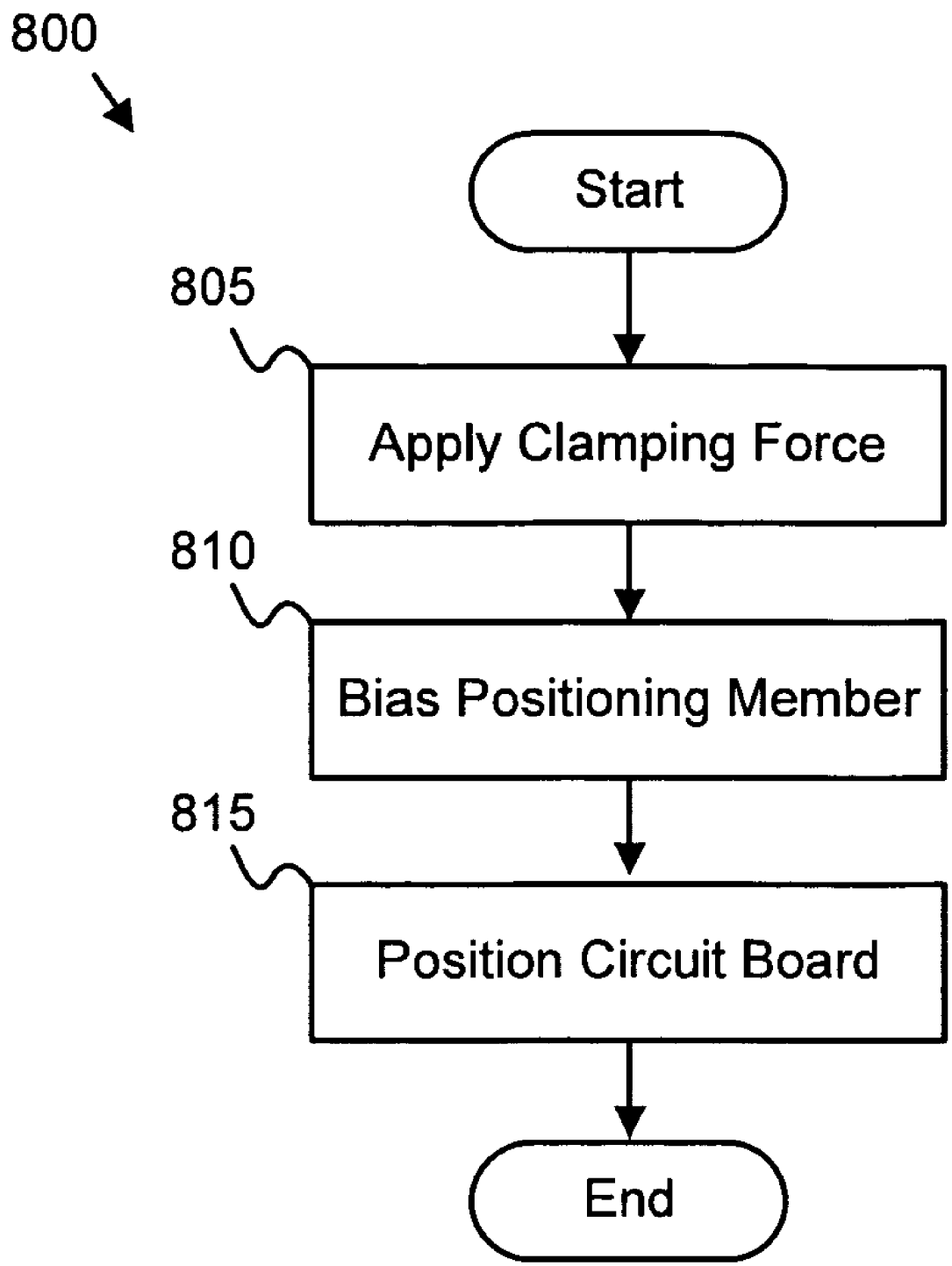
FIG. 8 is a schematic flow chart diagram illustrating one embodiment of a component positioning method of the present invention.

FIG. 8 is a schematic flow chart diagram illustrating one embodiment of a component positioning method 800 of the present invention. The method 800 substantially includes the steps necessary to carry out the functions presented above with respect to the operation of the described systems 100, 200, 300, 400, 500 of FIGS. 1-5 and apparatus 600 of FIG. 6.

The method 800 begins and a clamping member 220 applies 805 a clamping force to a levering member 215. The clamping member 220 and levering member 215 may be the clamping member 220 and levering member 215 of FIGS. 2-5. In one embodiment, a torque is applied to the clamping member 220 such that a threaded device of the clamping member 220 moves the clamping member 220 to create the clamping force.

The levering member 215 biases 810 a positioning member 210 such as the positioning member 210 of FIGS. 2-5 toward a PCB 115 such as the PCB 115 of FIGS. 2-5 in response to the clamping force. In one embodiment, the levering member 215 rotates about an initial pivot point 235. The levering member 215 is further linked to the positioning member 210 such that the rotation of the levering member 215 biases 810 the positioning member 210.

The positioning member 210 positions 815 the PCB 115 and a component 120 such as the component 120 of FIGS. 1-5 disposed on the PCB 115 in response to the positioning member's 210 bias. In one embodiment, the positioning member 210 positions 815 the component 120 to contact a thermal device 105 such as the thermal device 105 of FIGS. 1-5.

The present invention individually positions a component 120 on a PCB 115 in response to a clamping force. In addition, the present invention may allow the positioning of the component 120 from a space with limited clearance. The present invention may also allow the component 120 to be individually positioned if the component 120 is populated on the PCB 115.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to position a component within an enclosure, the apparatus comprising:
   a positioning member configured to position the component, wherein the component is disposed on a first side of a printed circuit board and the positioning member is disposed on an opposite second side of the printed circuit board relative to the first side, wherein the component has a thermal device adapted to be thermally connected to the component;
   a clamping member configured to apply a clamping force by, clampingly engaging a levering member and a structure, the levering member and the structure on the second side of the printed circuit board, the structure forming part of an enclosure or being supported on the enclosure; and
   the levering member connectedly linked to the positioning member and configured to bias the positioning member toward the printed circuit board in response to the clamping force of the clamping member, wherein the levering member pivots at a pivot point in response to the clamping force and biases the positioning member such that the positioning member contacts and positions the printed circuit board and the component such that the component is positioned against the thermal device, wherein the thermal device is supported independent of the clamping member such that the clamping force applies a force against a portion of the printed circuit board in contact with the component resulting in movement of the component toward the thermal device, the printed circuit board supported independent of the clamping member.

2. The apparatus of claim 1, wherein the levering member is connectedly linked at an angle to the positioning member.

3. The apparatus of claim 1, wherein the positioning member moves the component such that the component contacts the thermal device.

4. The apparatus of claim 1, wherein the thermal device comprises a heat sink.

5. The apparatus of claim 1, wherein the thermal device comprises a heat pipe.

6. The apparatus of claim 1, wherein the clamping member comprises a bolt.

7. The apparatus of claim 1, wherein the positioning member comprises a dome jack spring.

8. The apparatus of claim 1, wherein the clamping member is activated from the first side of the printed circuit board.

9. The apparatus of claim 1, wherein the positioning member further comprises a resilient contact ring configured to buffer contact between the positioning member and the printed circuit board.

10. The apparatus of claim 1, wherein the positioning member further comprises a component well configured to prevent the positioning member from contacting a specified portion of the printed circuit board.

11. A system to position an installed component in thermal contact with a thermal device within an enclosure, the system comprising:
- an enclosure and a standoff supported on the enclosure within the enclosure;
- a printed circuit board having a component disposed on a first side of the printed circuit board;
- a thermal device that removes heat from the component;
- a positioning member configured to position the printed circuit board and the component, wherein the positioning member is disposed on an opposite second side of the printed circuit board;
- a clamping member configured to apply a clamping force by applying an anchoring force to a levering member relative to the standoff;
- the standoff configured as a pivot point; and
- a levering member connectedly linked to the positioning member, wherein the positioning member is biased toward the printed circuit board by pivoting about the standoff in response to the clamping force of the clamping member against the levering member, wherein the levering member pivots against the standoff as a pivot point and biases the positioning member against the printed circuit board, wherein the positioning member contacts and positions the printed circuit board and positions the component such that the component is positioned against the thermal device, the thermal device supported independent of the clamping member such that the clamping force biases the printed circuit board and component toward the fixed thermal device, the printed circuit board supported independent from the clamping member.

12. The system of claim 11, further comprising a computer that comprises the thermal device, the positioning member, the clamping member, and the levering member.

13. The system of claim 12, wherein the computer is configured as a multiprocessor server.

14. The system of claim 11, wherein the positioning member positions the component to contact the thermal device.

15. The system of claim 11, wherein the clamping member is activated from the first side of the printed circuit board.

16. A method for deploying computer infrastructure in relation to a heat sink within an enclosure by positioning a component, the method comprising:
- applying a clamping force to a levering member by clampingly securing a clamping member to a structure, the structure forming part of or being supported on an enclosure within the enclosure;
- biasing a positioning member against a printed circuit board in response to the clamping force, the positioning member connectedly linked to the levering member, the printed circuit board supported independent of the clamping member, the printed circuit board comprising a component disposed on a first side of the printed circuit board, the positioning member biased against the printed circuit board on a second side of the printed circuit board that is opposite the first side where the component is disposed, wherein the clamping force biases the positioning member by pivoting the levering member against a pivot point such that the positioning member moves in an opposite direction of the clamping force against the levering member; and
- positioning the printed circuit board and the component disposed on the first side of the printed circuit board in response to the positioning member bias, wherein the component is positioned against a thermal device in response to the positioning member bias, the thermal device supported independent of the clamping member.

17. The method of claim 16, wherein biasing the positioning member comprises activating the levering member connectedly linked to the positioning member at an angle.

18. The method of claim 16, wherein the thermal device comprises a heat sink.

19. The method of claim 16, wherein the thermal device comprises a circulating coolant.

20. The method of claim 16, wherein applying the clamping force comprises tightening a bolt.

21. The method of claim 20, wherein the bolt is tightened from the first side of the printed circuit board.

22. The method of claim 16, further comprising a buffering contact between the positioning member and the printed circuit board.

23. The method of claim 16, further comprising preventing the positioning member from contacting a specified portion of the printed circuit board.

24. An apparatus to position a component, the apparatus comprising:
- means for applying a clamping force to a levering member by anchoring a positioning means to a structure of an enclosure or a structure supported on the enclosure within the enclosure;
- means for biasing a positioning member against a printed circuit board in response to the clamping force, the positioning member connectedly linked to the levering member, the printed circuit board supported independent of the positioning means, the printed circuit board comprising a component disposed on a first side of the printed circuit board, the positioning member biased against the printed circuit board on a second side of the printed circuit board that is opposite the first side where the component is disposed, wherein the clamping force biases the positioning member by pivoting the levering member against a pivot point such that the positioning member biases against the printed circuit board in an opposite direction of the clamping force against the levering member; and
- means for individually positioning the printed circuit board and the component disposed on the first side of the printed circuit board in response to the positioning member bias, wherein the component is positioned against a thermal device in response to the positioning member bias, the thermal device supported independent of the positioning means.

* * * * *